United States Patent [19]
Frodsham

[11] 3,925,890
[45] Dec. 16, 1975

[54] SPOON ATTACHMENT FOR SODA STRAW

[75] Inventor: Vaughn D. Frodsham, Fullerton, Calif.

[73] Assignee: Howard E. Huntington, Fullerton, Calif.

[22] Filed: June 29, 1973

[21] Appl. No.: 375,085

[52] U.S. Cl. .............................. 30/141; 229/1.5 C
[51] Int. Cl.² ......................................... A47J 43/28
[58] Field of Search .............. 30/141, 324; 206/216; 229/1.5 C

[56] References Cited
UNITED STATES PATENTS

| | | | |
|---|---|---|---|
| 1,490,785 | 4/1924 | Purnell | 30/141 |
| 1,666,106 | 4/1928 | Norman | 30/141 |
| 2,334,535 | 11/1943 | Bandell | 30/141 X |
| 3,038,256 | 6/1962 | Mayer | 30/141 |
| 3,618,802 | 11/1971 | Yates, Jr. | 220/60 R |
| 3,648,369 | 3/1972 | Frodsham | 30/141 |

*Primary Examiner*—William I. Price
*Assistant Examiner*—Steven M. Pollard
*Attorney, Agent, or Firm*—Wm. Jacquet Gribble

[57] ABSTRACT

A plastic spoon attachment, integrally molded with a conventional container cover, has spoon bowl wings separated by a tapering tunnel into which a soda straw end fits. When the straw is in place the wings and the periphery of the straw end define a spoon bowl for which the rest of the straw forms a handle. Preferably the spoon attachment and a container cover are injection molded in one piece with a parting line at the juncture of the spoon attachment and the cover.

1 Claim, 8 Drawing Figures

U.S. Patent   Dec. 16, 1975   3,925,890
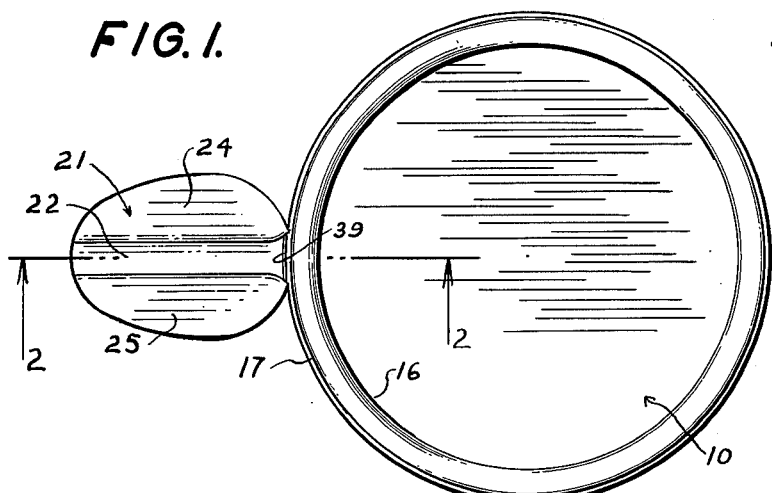
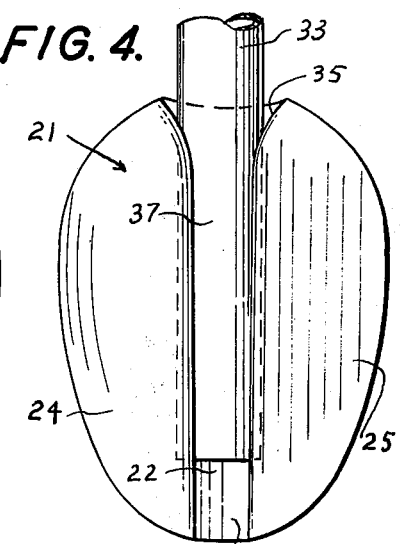
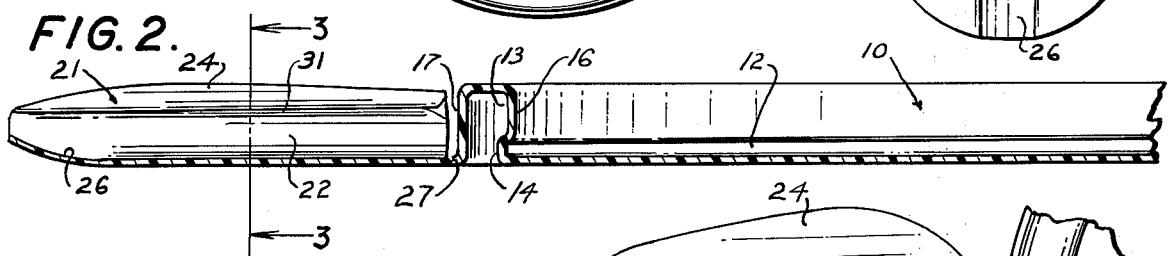
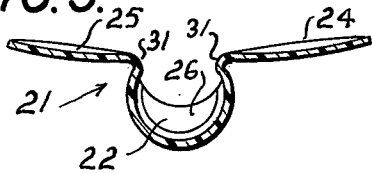
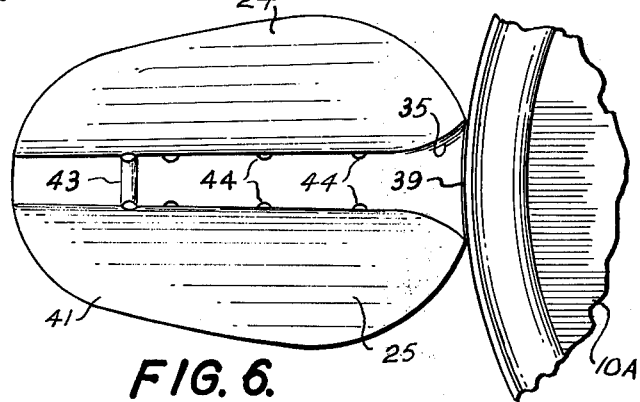
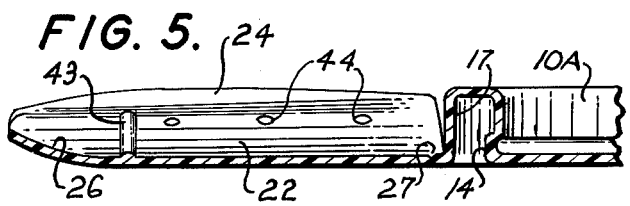
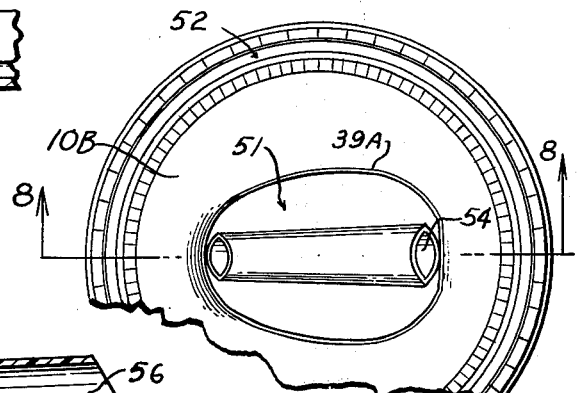
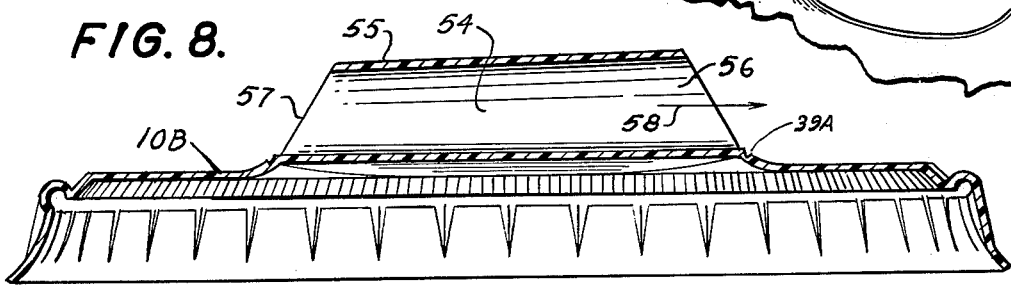

3,925,890

SPOON ATTACHMENT FOR SODA STRAW

BACKGROUND OF THE INVENTION

The invention relates to eating implements, and more particularly to such implements wherein a spoon or other food handling configuration is attachable to a soda straw for foods such as ice cream sodas, malts, shakes and other soda fountain confections. My prior U.S. Pat. No. 3,648,369, entitled "Eating Implement" and issued Mar. 14, 1972, in part exemplifies the field of art to which the invention is directed.

Cost factors are an important part of any food serving business. It has been previously known to furnish metallic spoons with long hollow handles to accomplish the purposes of the invention. However, such implements are costly in manufacture and must pass through a sterile wash to be reused. I have invented a spoon attachment combined with a container cover of such low cost that attachment, cover and container may be readily disposed of after use with no need for washing or reprocessing.

SUMMARY OF THE INVENTION

The invention contemplates a combined container cover and spoon attachment for a soda straw wherein the spoon attachment may be integrally molded with a container cover of conventional configuration. The spoon attachment comprises a substantially oval-shaped spoon bowl having a central tunnel along an axis of the spoon with the tunnel tapering from one end to the other: Preferably the tunnel is defined by a semicylindrical or semiconical wall which is integral with the right and left wings of the spoon bowl. Preferably there is an aperture the length of the tunnel such that the injection molded spoon attachment may be "sprung" away from the mold core without the necessity of movable core pins.

In one embodiment the spoon attachment extends from the peripheral wall of the container cover and a score line or other parting means defines the juncture between the two. In a second embodiment, which requires the use of movable core pins in molding, the spoon attachment and a container cover are integrally molded and a parting line on the cover defines the perimeter of the spoon attachment, the spoon attachment tunnel being a complete truncated hollow cone, necessitating the movable core pins.

The combined spoon attachment and container cover can readily be molded from common plastic materials, such as polyethylene, which are compatible with food use, can be fabricated utilizing conventional injection molding techniques and machinery and are simple in use. These and other advantages of the invention are apparent from the following detailed description and drawing:

BRIEF DESCRIPTION OF THE DRAWING

FIG. 1 is a plan view of a combined container cover and spoon attachment in accordance with the invention;

FIG. 2 is a fragmentary sectional elevation taken along line 2—2 of FIG. 1;

FIG. 3 is a sectional elevation taken along line 3—3 of FIG. 2;

FIG. 4 is a fragmentary elevational view of a spoon attachment detached from the cover and assembled with a soda straw;

FIG. 5 is a fragmentary sectional elevation of an alternate embodiment of the invention;

FIG. 6 is a fragmentary plan view of the spoon attachment and cover of the embodiment of FIG. 5;

FIG. 7 is a fragmentary plan view of a further alternate embodiment; and

FIG. 8 is a sectional elevation taken along line 8—8 of FIG. 7.

DESCRIPTION OF THE PREFERRED EMBODIMENTS

In the various views like parts are identified by like reference characters.

In the embodiment of FIGS. 1–3 a conventional container cover 10 of a food-safe plastic, such as polyethylene, has a top wall 12 recessed below an annulus 13 into which a container grip ring 14 projects near the bottom of the annulus. The annulus is defined by inner and outer cylindrical walls 16 and 17, respectively. A spoon attachment 21 for a straw is integrally formed with the container cover 10, being contiguous at the outer cover annular cylindrical wall 17. The spoon attachment has a central semicylindrical straw-receiving channel or tunnel 22 which separates the spoon attachment into spaced food handling spoon bowl wings 24, 25. As can best be seen from FIG. 2, the tunnel slopes from its bottom surface outwardly and upwardly in an end 26. The tunnel diameter diminishes from its point of attachment 27 to the container cover to its outer or suction end 26. This taper is graphically shown in FIG. 3 wherein the configuration of the spoon bowl wings 24 and 25 in cross section is illustrated. The wings are joined to the tunnel wall by radial transition portions 31 such that the straw attachment is molded in one piece.

It is contemplated that a single molded piece such as the spoon attachment and cover of the embodiment of FIG. 1 can be made for approximately four mills. Assembled as shown in FIG. 4 with a conventional plastic soda straw 33 the spoon attachment 21, when separated from the cover 10, affords an economical and effective implement for eating solids and semisolids from a container. The radial transition portions 31 joining the wings and the tunnel are spaced apart a distance less than the normal diameter of a soda straw such that they contain the straw despite the pressure of loading the eating implement against solids and semisolids. Since straw diameters vary slightly the taper of the tunnel is calculated to accommodate the normal range of straw sizes. The assembly of the straw and spoon attachment will therefore differ from straw size to straw size only in the depth to which the straw penetrates the tunnel from the diverging tunnel opening 35 (see FIG. 4) which eases the entry of the straw into the tunnel. When assembled, the lower end of the straw periphery 37 bridges the gap between transition portions 31 such that the spoon attachment presents a substantially continuous surface for scooping up solid and semisolid material.

A limitation on the upward extent of end 26 is imposed by the necessity of separating the transition portions 31 for removal from the injection mold. Most of the contemplated materials, such as polyethylene, polypropylene and polystyrene, are sufficiently flexible, particularly when hot, to permit their yielding to pop the straw attachment from the portion of the mold which defines the tunnel 22. A mold component (not shown) may also define a separation line 39 adjacent the attachment point between the cover and the spoon attachment. Line 39 can be either a V-shaped indentation or a thin spot in the material joining the two components of the assembly. Such a weakened area lends itself to separation between the two assembly components such that the spoon attachment may be separately attached to a soda straw.

Like the embodiment of FIG. 1, the embodiments of FIGS. 5 and 6 has two integrally molded components, a container cover 10A of conventional configuration and a spoon straw attachment 41 similar in most respects to the attachment 21 of the embodiment of FIG. 1. A tapering straw-receiving tunnel 22 separates spoon bowl wings 24, 25 of the spoon attachment, the tunnel having an upwardly sloping outer end 26 and a diverging entry throat 35, as in the previously described embodiment.

Additionally, spoon attachment 41 of the embodiment of FIG. 5 comprises a semicircular stop rib 43 adjacent sloping end 26 and a plurality of gripping buttons 44 projecting inwardly into the tunnel 22 to cramp against a soda straw thrust into the tunnel. This affords a tighter grip on the soda straw in case the plastic materials of the spoon attachment and the straw used afford little friction bind.

Like the previously described embodiment, a separation line 39 at the juncture of the attachment and the cover affords easy means for separating the two components such that the straw may be joined with the spoon attachment.

FIGS. 6 and 7 illustrate a further alternate embodiment of the invention wherein a spoon attachment 51 is contained within the periphery of the conventional container cover 10B. The assembly 52 of FIG. 6 thus has both a spoon attachment and cover. However, a parting line 39A circumscribing the spoon attachment is centered in the container cover such that its removal results in an aperture into which the spoon attachment on a straw may be inserted for using the straw to remove liquid within the container.

In the embodiment of FIG. 6 a straw-receiving tunnel 54 is defined by a substantially conical wall 55 which diminishes from entry end 56 to suction end 57. The taper thus accommodates insertion of straws of differing diameters. However, since the wall is continuous, the molding of the embodiment of FIG. 6 requires a mold in which a movable core pin is withdrawn in the direction of arrow 58 from the spoon attachment prior to removal of the cover and spoon attachment assembly from the mold. The configuration of the cover 10B is conventional and sizes may vary in both of the covers illustrated without affecting the inventive concept disclosed herein.

While several alternate embodiments of the invention have been disclosed herein, other variations within the scope of the invention will occur to those skilled in the art. The disclosed embodiments are to be regarded as illustrative only and it is desired that the scope of the invention is to be defined by the claims appended hereto.

I claim:

1. A spoon bowl attachment for cooperation with a soda straw comprising a substantially cylindrical wall defining a straw-receiving tunnel open along one side and enveloping a major portion of the straw section therein, spoon bowl wings extending away from the longitudinal axis of the tunnel and attached to the cylindrical wall, said tunnel diminishing in cross section toward the tip of the spoon bowl remote from the straw so as to grip a soda straw inserted therein, and an end wall of the tunnel tending to close the suction end of the tunnel.

* * * * *